Patented Jan. 23, 1940

2,188,008

UNITED STATES PATENT OFFICE 2,188,008

PROCESS OF CONCENTRATING VITAMINS FROM FISH PRESS WATER

Sven H. Lassen, Los Angeles, Calif., assignor to Philip R. Park, Inc., Outer Harbor, San Pedro, Calif., a corporation of California No Drawing. Application March 8, 1937, Serial No. 129,648

22 Claims. (Cl. 167—81)

My invention relates to the production of a material containing high concentration of vitamins, and it is the particular object of the invention to provide a process of concentrating the water soluble vitamins present and isolating the growth promoting vitamin flavin from so-called fish press-water.

My invention further relates to vitamin preparations, and it is an object of my invention to provide vitamin preparations comprising fish concentrates in which the concentration of one or more vitamins of the vitamin B complex, particularly the growth promoting vitamin flavin, has been increased with respect to other constituents of the fish, as by my process. It is a further object of my invention to provide vitamin preparations comprising fish concentrates characterized by an enhanced ratio of one or more group B vitamins to connate water-insoluble constituents, or to inactive connate water-insoluble constituents, or both, said enhanced ratio being substantially greater in my concentrates than in the crude fish.

Further objects and aspects of the invention will be apparent from the following.

By "a vitamin preparation" I mean either a preparation which may be used directly as a food supplement or pharmaceutical in recognition of and in correspondence with its vitamin content, as in the prevention and cure of deficiency diseases, or a vitamin containing preparation which is useful as an intermediate in the manufacture of more concentrated or purer vitamin products.

A relatively large industry is devoted to the manufacture of fish meal, in which manufacture the press-water with which this invention is concerned is produced as a waste by-product. The fish worked up into meal are of the small type, consisting of one or more of the four species, sardines, mackerel, menhaden, and herring. These small fish are cooked or partially cooked whole, without cleaning or discarding any portion, and are then subjected to a pressing operation in which the liquid or aqueous constituents of the fish are expressed to leave behind the desired solid meal. The expressed liquor is usually allowed to stand hot for a short period of time to permit oil to accumulate on the surface whence it is removed by skimming. The remaining aqueous liquid, or press-water, is then sent to waste.

The disposal of the waste press-water has hitherto constituted a great burden on the industry, since decomposition sets in very rapidly as soon as the press-water has cooled appreciably, causing the formation of such foul odors that the discharge of this material in rivers or harbors has been expressly prohibited by law. It has accordingly been necessary to transport this material several miles to sea by means of pipe-lines or barges before it could be dumped, thus requiring extensive disposal facilities to handle the several thousands of gallons hourly produced in the average sized plant.

The press-water thus produced is a somewhat cloudy, viscous liquid, containing in solution the water-soluble constituents of the fish, and carrying in suspension a small amount of insoluble proteinaceous material together with some emulsified oil.

In contravention to popular opinion of those skilled in the art that vitamin G, or flavin, is present only in very small amounts in fish tissues, I have found that press-water constitutes a rich source of flavin. I have proved by biological tests with rats, as well as by direct fluoroscopic analysis, that the mentioned press-water, a waste product from fish meal plants, is a rich source of flavin.

So far as I know, the growth promoting vitamin G is at present manufactured exclusively from the whey of cows' milk. Flavin, or vitamin G, has also been found in liver, eggs, and in rice polishings, and has been isolated in the laboratory. So far the only commercially successful source of flavin, however, has been the whey from which flavin concentrate, known as lactoflavin, is at the present time manufactured.

Comparing whey of milk and fish press-water from the standpoint of their relative richness in vitamin content, whey is known to contain from 30 to 40 Bourquin-Sherman units per 100 grams of the material, whereas I have found that fish press-water, for instance sardine press-water, contains from 60 to 125 Bourquin-Sherman units per 100 grams of the substance.

One of the greatest difficulties encountered in making concentrations of flavin or vitamin G is the separation of the flavin from other substances found in the raw material. With regard to fish press-water, it contains among other substances proteins and protein derivatives, some of which are coagulable and some of which are non-coagulable. There is also in many instances a considerable amount of oil in the press-water, as well as insoluble substances either lighter or heavier than the liquid. Such insoluble substances may be removed from the press-water by centrifugal or gravitational treatment or by filtration, although the latter treatment with known filtration methods is not as efficient as the other mentioned treatments. Such treatment may in some instances be considered to be the initial step in my process.

I have found that fish press-water contains a considerable quantity of proteolytic enzymes which possess the peculiar capability of breaking down protein and protein derivatives to the amino acids, but apparently without affecting the vitamin factor of the material.

After the insoluble substances have been removed either by centrifuging or settling or filtering or, usually, simply after removal of a portion of the oil by skimming, the liquid containing substantially all of the water-soluble vitamin and vitamin-like constituents of the original press-water, protein, protein derivatives, amino acids, and proteolytic enzymes, may be syphoned or run off into a second container. The potent liquid is now treated to removed the readily coagulable protein content by the addition of a chemical coagulant, which chemical coagulation also serves to remove the enzymes or to prevent further action of the enzymes on the non-coagulable protein derivative content and the consequent fermentation of the liquid when it is allowed to stand.

This step may be accomplished by agitating the liquid after the addition thereto of salts or hydroxides of the alkaline earths, or such precipitates as copper-hydroxide-carbonate or lead acetate. However, I have found that alum, preferably in powdered form, when mixed with the liquid is a rather wide range of proportions, but preferably from .25 to .50 of 1% of the weight of the liquid, is particularly efficacious in promoting coagulation or precipitation of the protein content of the liquid. All of the alums tested in this capacity, for instance potassium alum, sodium alum, and ammonium alum, have been found to be effective as is also simple aluminum sulfate. The alum when added to the liquid is partially converted by hydrolysis into aluminum hydroxide which precipitates and occludes colloidal proteins, protein derivatives, and protein-like material. The action of the alum by changing the pH value of the solution substantially on the acid side of neutrality apparently inhibits the enzymatic working of the liquid during agitation, and the enzymes are likewise thrown down with the precipitate. This manipulation in which the coagulable protein content carrying the enzymes is occluded by the aluminum hydroxide particles renders the liquid readily filterable. I have found by actual experiments that the filtration capacity of the filter is increased from ten to thirty times by use of alum as stated above.

The liquid may next be filtered or otherwise treated to separate the precipitated substances therefrom. The separated liquid is now a prefectly clear serum, slightly yellow in color, and possessing a very mild fish smell. The potent serum still contains substantially all of the vitamin content of the original press-water, particularly flavin, and also vitamin $B_1$. By reason of the absence of the major portion of the protein and protein derivatives, and, as I believe, the substantially complete absence of the enzymes, the potent serum will keep for several days without fermentation. I have found that when alum or other chemical coagulant is not used as above disclosed, the liquid will ferment wildly over night and will possess a foul odor, making the material particularly difficult to work with and causing the use thereof to be objectionable except in isolated places.

The potent serum may be further concentrated from its present state to produce a rich concentrate of flavin suitable for use as a food supplement by vacuum concentration. During such vacuum concentration it will be found that flavin or vitamin G suffers less decomposition during concentration if the acidity of the serum is maintained below 7 pH. Although vitamin G compared with many other of the vitamins is particularly stable toward heat, concentration should take place below atmospheric pressure and preferably at temperatures as low as possible in the vacuum pan. In most cases the pH value of the liquid will remain substantially on the acid side of neutrality (below pH 7) by reason of the previous treatment with the alum, but if necessary the pH value may be adjusted during or before distillation by known methods.

During concentration considerable change takes place in the product. The mild fish odor, characteristic of the purified liquid before distillation, changes into a sweet aromatic odor resembling that of meat extracts. The viscosity of the product changes and eventually approximates that of molasses, and the color changes from light yellow to brown with a greenish tinge which is characteristic of flavin concentrates.

The degree of concentration after the treatment with the alum can be varied according to requirement. I contemplate, however, a flavin concentrate for use as a food supplement in which the flavin is concentrated ten to thirty times. Such a concentrate contains from 600 to 3000 Bourquin-Sherman units of flavin or vitamin G (growth promoting factor) per 100 grams, a considerable quantity of vitamin $B_1$ (the antineuritic factor), dietetically useful mineral salts, from 20% to 40% of protein in the form of easily assimilable protein derivatives, such as peptones, polypeptides, peptides, and some amino acids, and possibly certain other entities of specific nutritive value which have not yet been fully classified. By making specific reference to the percentage of concentration of flavin (vitamin G) from fish press-water I do not intend to affim that no other vitamins are present. As before stated, a substantial concentration of vitamin $B_1$ (antineuritic factor) is present in the concentrate. The fish press-water contains 50 to 80 Chase-Sherman units of vitamin $B_1$ per 100 grams, and the anti-neuritic potency of the concentrate is from 10 to 30 times this value for a ten to thirty fold concentration.

The concentrate, rich in flavin and other factors, derived by the process thus far described is particularly adapted for use as a food supplement. It should be understood that by the expression "food supplement" I mean that the concentration is suitable for the addition to human foodstuffs as well as animal and poultry feeds. The concentrate has no attendant materials which are non-nutritive or which tend to produce fermentation in the gastro-intestinal tract of adults or infants. The concentrate, having a mild meat extract odor, is not distasteful when added directly to the diet of either infants or adults, or when impregnated in various prepared foods. The concentrate, in the form described above, is ideally suited for mixing directly with animal and poultry feed. It has the advantage that besides having a highly potent flavin content, and vitamin $B_1$, as well as other nutritive value, it does not give an unpleasant odor to the feed, and there is no likelihood of causing the meat of the animal or fowl which has been fed the concentrate to acquire an unpleasant taste.

To produce pure crystalline flavin (vitamin G), I dispense with the vacuum concentration steps subsequent to the treatment of the press-water with alum and the filtration, and subject the cleared filtrate solution to contact with a solid adsorbent in the presence of an acid, and subsequently treat the solid material to extract the pure flavin, adsorbed on the solid, therefrom.

It is known that certain inorganic materials, such as the highly adsorbent fuller's earth, have a particularly high adsorptive power for vitamins and vitamin-like entities. Other hydrous aluminum silicates such as bentonite, floridin, blankit, frankonit, and similar clays in their natural state or activated, are likewise efficacious in this respect. Likewise, bleaching chars, such as norrit, darco, etc. are efficient in adsorbing vitamin or vitamin-like entities.

In carrying out this phase of my process the clear filtrate is placed in a container with suitable agitating means provided, and the adsorbent is added thereto in the approximate proportions of 10 grams of the adsorbent for each liter of the solution. The solution and the adsorbent are agitated for an hour or more in the presence of a suitable acid for the purpose of facilitating the rate of adsorption of the adsorbent material. A suitable acid for this purpose is hydrochloric acid, and I have found that proportions approximating 100 cc. of the acid per liter of the solution are efficacious in this regard. Another suitable acid which I have found for this purpose is acetic acid, although more expensive than hydrochloric acid and not so easily available. After allowing the adsorbent to settle, the supernatant liquid may be syphoned or run off. The solid adsorbent with the main portion of the vitamin content of the material adsorbed thereon is washed completely and then agitated in the presence of a medium capable of extracting the vitamin from the solid.

I have found that a mixture of an alcohol, a pyridine base, and water is particularly efficient to accomplish the release of the adsorbed vitamins (flavin) from the adsorbent. Such a mixture is efficient for the purpose over a rather wide range of proportions, but I have found that proportions of one part of an alcohol (for instance, methyl alcohol), one part of a pyridine base (for instance, pyridine), and four parts water, are particularly efficacious in accomplishing the release of the adsorbed vitamin content from the adsorbent in the shortest time.

After agitation the material is allowed to settle until substantially all of the adsorbent from which the vitamins have been released has settled out and the supernatant liquid is syphoned or run off, the cleared liquid thus acquired containing substantially all of the vitamin content (flavin) and the other vitamin-like entities which were present in the original press-water.

The substantially clear solution acquired in the last step may then be centrifuged to remove such adsorbent (fuller's earth or other hydrous aluminum silicate, or bleaching char) as may not have settled out of the solution. The cleared liquid is then vacuum concentrated until the liquid is reduced to a very small volume containing the potent concentration of vitamin G (flavin).

In some instances it may be necessary or desirable to next treat the reduced volume of the liquid to remove the last traces of the adsorbent (fuller's earth) therefrom. This may be accomplished by adding an excess of an alcohol (such as methyl alcohol) which precipitates the last trace of the adsorbent which may have been carried in suspension in the liquid.

The solution may then be again centrifuged to separate this precipitate from the alcoholic solution, and the alcoholic solution is then introduced into a suitable evaporator to evaporate the alcohol out of the solution and again reduce the volume of the concentrate.

Additional impurities are next removed from the solution by the addition of a solvent, preferably acetone, after which the acetone solution is vacuum concentrated to rid the solution of the acetone. I prefer to further clear the solution by ether extraction, the solution being agitated with an ether until the ether solution no longer becomes discolored.

In some instances it may be necessary or desirable to remove some additional impurities at this point by adsorption with fuller's earth, although the addition of an acid, such as the above suggested hydrochloric acid, should not be necessary to assist adsorption at this point. If this second adsorption step is utilized, the vitamins may be recovered from the adsorbent by steps similar to the steps disclosed above, namely, agitating in the presence of an aqueous alcoholic solution (methyl alcohol, pyridine base, and water), centrifuging the cleared solution, and vacuum concentrating and evaporating to remove the alcohol and pyridine base from the solution.

The aqueous solution at this point in the process is an extremely potent solution of vitamin G or flavin, suitable in this form for medicinal use in various ways known to the medical profession or for the preparation of foodstuffs, infants' food, or the like by directly impregnating the food with the flavin solution in desired proportions. If it is desired to produce pure crystallized flavin, other manipulations designed to free the water soluble vitamins from the solution may be used, including precipitation of the vitamins by use of a precipitant having a particular affinity for adsorption of vitamins and subsequent steps for freeing the precipitate from the precipitant.

In precipitating the vitamin content of the solution, I prefer to utilize silver nitrate which I have found to be particularly efficacious in precipitating the flavin. The solution is taken up in water, and a solution of silver nitrate (preferably 5% solution) is added until no further precipitation takes place.

The precipitate, in case silver nitrate is used, may be suspended in water in a suitable container after separation from the liquid by centrifugation and then subjected to contact with hydrogen sulfide which precipitates the silver, leaving the flavin in the aqueous solution. The precipitate may then be separated by filtration.

After filtration, as above mentioned, the aqueous solution may be evaporated down to a small volume, and upon standing the pure flavin (vitamin G) will crystallize out of the solution.

It should be understood that the essence of my invention resides primarily in the concentration and isolation of vitamins and vitamin-like entities, particularly vitamin G and also vitamin $B_1$, from fish press-water without affecting the nutritive potency of these vitamins as found in the original press-water; and, further, that the concentrated food supplement product discussed above contains from 1000 to 3000 Bourquin-Sherman units of flavin (vitamin G) per 100 grams of the concentrate, vitamin B1 in substantial quantities, dietetically useful mineral salts, and from 20 to 40% of protein in the form of easily assimilable protein derivatives. This product is characterized by the above-mentioned high degree of concentration of flavin (vitamin G) not previously known to exist in fish products such as fish press-water.

As previously indicated, flavin is not the only vitamin I have found in fish press-water, specific reference having already been made to vitamin B1 or the anti-neutritic factor whose presence I have determined by biological assay on rats according to the Chase-Sherman method.

I have determined the presence of flavin in the supernatant liquid of my process by the characteristic yellowish-green fluorescence given off by the liquid when exposed in the dark to the influence of ultra-violet light; by the characteristic crystalline structure of flavin when the vitamin content of the liquid was adsorbed on fuller's earth and subsequently leached from the earth and refined as hereinbefore described and then crystallized; and by actual biological tests on rats according to the Bourquin-Sherman technique.

In referring to the vitamins which I have thus far definitely identified, I do not mean that these are the only vitamins recoverable from fish press-water by my process. Accordingly, my invention is not to be limited in any way by the vitamins produced but the process is to be looked upon as one for recovering the vitamin content of fish press-water, regardless of the nature of the vitamins obtained.

In the disclosure of my process I have mentioned specifically various coordinated steps by which the process may be carried out, but it should be understood that I am not to be limited to the exact manipulations mentioned, as others than those specified might be used. My novel process of producing my concentrate as a food supplement should be considered to be characterized by the partial removal of the protein content of the fish press-water together with the removal or inactivation of proteolytic enzymes, which is accomplished by the precipitation of the readily coagulable proteins through the use of chemical coagulants and separation of the precipitate to produce a clarified liquid stabilized against enzymolysis. Further than the above steps of the process, the invention should not be limited by the disclosure but should be accorded the full scope of the appended claims.

I claim as my invention:

1. A process of concentrating the vitamin content of fish press-water, which includes the steps of: precipitating the coagulable protein matter from the press-water by means of an alum to inhibit enzymolysis in the press-water, whereby the proteolytic enzymes are thrown down with the precipitate; filtering the supernatant liquid, the filtrate being substantially free from coagulable protein matter and enzymes and containing substantially all of the vitamin content of the original press-water, and recovering the vitamin content of said liquid.

2. A process of concentrating the vitamin content of fish press-water, which includes the steps of: precipitating the coagulable protein matter from the press-water by means of an alum to inhibit enzymolysis in the press-water, whereby the proteolytic enzymes are thrown down with the precipitate; filtering the supernatant liquid, the filtrate being substantially free from coagulable protein matter and enzymes and containing substantially all of the vitamin content of the original press-water; and reducing the volume of the filtrate solution to further concentrate the vitamin content, the acidity of the solution being maintained throughout such concentration below 7 pH.

3. A process of concentrating flavin from fish press-water, which includes the steps of: precipitating the coagulable protein while inhibiting enzymolysis in the press-water by use of alum added in an amount to maintain the pH value of the liquid below 7; separating the supernatant liquid; and further concentrating the liquid by vacuum concentration at as low a temperature as possible in the vacuum pan.

4. A process of concentrating flavin from fish press-water, which includes the steps of: precipitating the coagulable protein while inhibiting enzymolysis in the press-water by use of alum added in the amount of .25 to .50 of 1% of the weight of the liquid; separating the supernatant liquid; and further concentrating the liquid by vacuum concentration with evaporation occurring at as low temperature as possible in the vacuum.

5. A process of concentrating flavin from fish press-water, which includes the steps of: precipitating the coagulable protein while inhibiting enzymolysis in the press-water by use of alum added in the amount of .25 to .50 of 1% of the weight of the liquid; separating the supernatant liquid; and reducing the volume of the liquid at a relatively low temperature and at a pH value below 7 to produce the desired degree of concentration of the vitamin content.

6. A process of concentrating and isolating flavin from fish press-water, which includes the steps of: precipitating the coagulable protein matter from the press-water while inhibiting enzymolysis therein by use of alum added thereto; separating the supernatant liquid; treating the liquid with a solid inorganic adsorptive agent capable of adsorbing vitamin-like entities; separating the solid absorbent with the adsorbed vitamin content from the supernatant liquid; treating the adsorbent to extract the adsorbed vitamin content therefrom with an aqueous solution of an alcohol; and evaporating the alcoholic content from the solution.

7. A process of concentrating and isolating flavin from fish press-water, which includes the steps of: precipitating the coagulable protein matter from the press-water while inhibiting enzymolysis therein by use of alum added thereto; separating the supernatant liquid; mixing the liquid with a solid inorganic adsorptive agent for vitamin-like entities, in the presence of an acid capable of increasing the rate of adsorption of said adsorbent; separating the adsorbent with the adsorbed flavin content from the liquid; treating the adsorbent with an aqueous solution of an alcohol together with a pyridine base to extract the adsorbed flavin from said adsorbent; evaporating the alcoholic solution from the flavin-potent solution; treating the solution with acetone to throw down certain impurities; vacuum concentrating to rid the solution of the acetone; and treating the potent solution by ether extraction to remove additional impurities.

8. A process of concentrating and isolating flavin from fish press-water, which includes the steps of: precipitating the coagulable protein matter from the press-water while inhibiting enzymolysis therein by use of alum added thereto; separating the supernatant liquid; mixing the liquid with a solid inorganic adsorptive agent capable of adsorbing vitamin-like entities, in the presence of hydrochloric acid in an amount sufficient to increase the adsorptive rate of said adsorbent; separating the adsorbent with the occluded flavin content from the liquid; treating the adsorbent with an aqueous alcoholic solution comprising one part methyl alcohol, one part of a pyridine base, and four parts water, to extract the adsorbed flavin from said adsorbent; evaporating the alcoholic solution from the flavin-potent solution; treating the solution with acetone to throw down certain impurities; vacuum concentrating to rid the solution of the acetone; and treating the potent solution by ether extraction to remove additional impurities.

9. A process of concentrating and isolating flavin from fish press-water, which includes the steps of: precipitating the coagulable protein matter from the press-water while inhibiting enzymolysis therein by use of alum added thereto in proportions of .25 to .50 of 1% by weight of the liquid; separating the supernatant liquid; mixing the liquid with a solid inorganic adsorptive agent capable of adsorbing vitamin-like entities, in the presence of an acid capable of increasing the adsorptive rate of said adsorbent; separating the adsorbent with the adsorbed flavin content from the liquid; treating the adsorbent with an aqueous solution of an alcohol together with a pyridine base to extract the adsorbed flavin from said adsorbent; evaporating the alcoholic solution from the flavin-potent solution; treating the solution with acetone to throw down certain impurities; vacuum concentrating the solution to remove the acetone; and treating the potent solution by ether extraction to remove additional impurities.

10. A process of concentrating and isolating flavin from fish press-water, which includes the steps of: precipitating the coagulable protein matter from the press-water while inhibiting enzymolysis therein by use of alum added thereto; separating the supernatant liquid; mixing the liquid with a solid inorganic adsorptive agent capable of adsorbing vitamin-like entities, in the presence of an acid capable of increasing the adsorptive rate of said adsorbent; separating the adsorbent with the adsorbed flavin content from the liquid; treating the adsorbent with an aqueous solution of an alcohol together with a pyridine base to extract the adsorbed flavin from said adsorbent; separating the clear potent solution extracted from said adsorbent; reducing the volume of the potent solution by evaporation; precipitating the last trace of the adsorbent by the addition of an excess of an alcohol; evaporating the alcoholic solution from the flavin-potent solution; treating the solution with acetone to throw down certain impurities; vacuum concentrating the solution to remove the acetone; and treating the potent solution by ether extraction to remove additional impurities.

11. A process as specified in claim 7 in which the flavin-potent solution is further concentrated by precipitation of flavin from the potent solution with silver nitrate; suspending the precipitate in water and by the addition of hydrogen sulfide precipitating the silver; separating the potent solution from the precipitate; and evaporating the potent solution to a small volume to produce crystallization of pure flavin therefrom.

12. A process as specified in claim 8 in which the flavin-potent solution is further concentrated by precipitation of flavin from the potent solution with silver nitrate; suspending the precipitate in water and by the addition of hydrogen sulfide precipitating the silver; separating the potent solution from the precipitate; and evaporating the potent solution to a small volume to produce crystallization of pure flavin therefrom.

13. A process as specified in claim 9 in which the flavin-potent solution is further concentrated by precipitation of flavin from the potent solution with silver nitrate; suspending the precipitate in water and by the addition of hydrogen sulfide precipitating the silver; separating the potent solution from the precipitate; and evaporating the potent solution to a small volume to produce crystallization of pure flavin therefrom.

14. A process as specified in claim 10 in which the flavin-potent solution is further concentrated by precipitation of flavin from the potent solution with silver nitrate; suspending the precipitate in water and by the addition of hydrogen sulfide precipitating the silver; separating the potent solution from the precipitate; and evaporating the potent solution to a small volume to produce crystallization of pure flavin therefrom.

15. A process which comprises treating fish press-water with an alum to precipitate coagulable protein matter and proteolytic enzymes therefrom, and recovering from the resultant supernatant liquid a product rich in vitamins.

16. A process which comprises treating fish press-water with an alum to precipitate coagulable protein matter and proteolytic enzymes therefrom, concentrting the resultant supernatant liquid to a product rich in vitamins, and recovering said product.

17. A process for obtaining vitamins from fish press-water which comprises treating the press-water with a chemical coagulant to precipitate readily coagulable proteins and prevent enzymolysis, separating the precipitate from the liquid stabilized against enzymolysis and containing the vitamin content of the press-water, concentrating said liquid to a product rich in vitamins, and recovering said product.

18. The process as defined in claim 17 further characterized in that said chemical coagulant is acidic in reaction.

19. The process as defined in claim 17 further characterized in that said liquid is maintained at a pH less than 7 during the concentration thereof.

20. The process as defined in claim 17 further characterized in that said liquid is concentrated by evaporation under subatmospheric pressure.

21. The process as defined in claim 17 further characterized in that said liquid is concentrated to a product rich in vitamins by absorption of the vitamins on a solid adsorbent.

22. A process for obtaining vitamins from fish press-water which comprises treating the press-water prior to any substantial decomposition thereof with a chemical coagulant to precipitate readily coagulable proteins and prevent enzymolysis, separating the precipitate from the liquid stabilized against enzymolysis and containing the vitamin content of the press-water, concentrating said liquid to a product rich in vitamins, and recovering said product.

SVEN H. LASSEN.

CERTIFICATE OF CORRECTION.

Patent No. 2,188,008. January 23, 1940.

SVEN H. LASSEN.

It is hereby certified that error appears in the printed specification of the above numbered patent requiring correction as follows: Page 1, first column, line 20, for the word "water-insoluble" read water-soluble; page 2, first column, line 20, for "removed" read remove; line 34, for "is" read in; and second column, line 43-44, for "neutritive" read nutritive; page 5, second column, line 38, claim 16, for "concentrting" read concentrating; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.